US010587437B2

(12) United States Patent
Kim et al.

(10) Patent No.: US 10,587,437 B2
(45) Date of Patent: Mar. 10, 2020

(54) LINK AGGREGATOR WITH UNIVERSAL PACKET SCRAMBLER APPARATUS AND METHOD

(71) Applicant: Texas Instruments Incorporated, Dallas, TX (US)

(72) Inventors: Seuk Bo Kim, Plano, TX (US); T-Pinn R. Koh, Allen, TX (US)

(73) Assignee: TEXAS INSTRUMENTS INCORPORATED, Dallas, TX (US)

(*) Notice: Subject to any disclaimer, the term of this patent is extended or adjusted under 35 U.S.C. 154(b) by 691 days.

(21) Appl. No.: 14/248,709

(22) Filed: Apr. 9, 2014

(65) Prior Publication Data

US 2014/0362990 A1 Dec. 11, 2014

Related U.S. Application Data

(60) Provisional application No. 61/833,285, filed on Jun. 10, 2013.

(51) Int. Cl.
*H04L 25/03* (2006.01)

(52) U.S. Cl.
CPC ............... *H04L 25/03872* (2013.01)

(58) Field of Classification Search
CPC combination set(s) only.
See application file for complete search history.

(56) References Cited

U.S. PATENT DOCUMENTS

| | | | |
|---|---|---|---|
| 4,084,196 A * | 4/1978 | Tisue | H04N 1/4051 358/3.15 |
| 4,744,104 A | 5/1988 | Pospischil | |
| 5,267,316 A * | 11/1993 | Merino Gonzalez | H04L 25/03872 380/268 |
| 5,377,265 A | 12/1994 | Wettengel et al. | |
| 5,901,079 A * | 5/1999 | Chiu | G11C 11/412 365/154 |
| 6,820,230 B2 | 11/2004 | Sweeney | |
| 6,907,062 B2 | 6/2005 | Carlson | |
| 7,124,158 B2 | 10/2006 | Ruthstein et al. | |

(Continued)

OTHER PUBLICATIONS

IEEE Standard for Information Technology, Part 3: Carrier Sense Multiple Access With Collision Detection (CSMA/CD) Access Method and Physical Layer Specification, 802.3-2008, 615 pgs.

*Primary Examiner* — Lynn D Feild
*Assistant Examiner* — Richard A McCoy
(74) *Attorney, Agent, or Firm* — Ebby Abraham; Charles A. Brill; Frank D. Cimino

(57) ABSTRACT

Apparatus and methods are presented for using configurable additive data scrambling or descrambling circuitry for multichannel link aggregators in which a scrambler or descrambler polynomial is specified by binary data in a programmable register, and the polynomial data is used to compute a polynomial matrix. A scrambler or descrambler pattern is computed according to the polynomial matrix, and input data is bitwise exclusive-ORed with the computed scrambler or descrambler pattern to generate scrambled or descrambled output data. The scrambling or descrambling circuitry can be reconfigured for different polynomials by reprogramming the register, with the scrambler or descrambler automatically computing an updated polynomial matrix.

11 Claims, 9 Drawing Sheets

(56) References Cited

U.S. PATENT DOCUMENTS

| | | | |
|---|---|---|---|
| 7,161,955 B1* | 1/2007 | Zeng | H04L 7/042 |
| | | | 370/466 |
| 7,227,949 B2 | 6/2007 | Heegard et al. | |
| 7,414,112 B2 | 8/2008 | Grimaldi et al. | |
| 7,486,725 B2 | 2/2009 | Chen et al. | |
| 7,505,589 B2 | 3/2009 | Lablans | |
| 8,392,781 B2 | 3/2013 | Bata et al. | |
| 2003/0014451 A1* | 1/2003 | Peyser | G06F 7/584 |
| | | | 708/250 |
| 2003/0217320 A1* | 11/2003 | Gorshe | H03M 13/09 |
| | | | 714/758 |
| 2004/0250187 A1* | 12/2004 | Schauer | H04L 12/42 |
| | | | 714/728 |
| 2005/0117557 A1* | 6/2005 | Lakkis | H03M 13/116 |
| | | | 370/338 |
| 2007/0098160 A1 | 5/2007 | Lablans | |
| 2008/0109707 A1* | 5/2008 | Dell | H03M 13/03 |
| | | | 714/776 |
| 2010/0241874 A1* | 9/2010 | Vergnes | G06F 21/71 |
| | | | 713/193 |
| 2011/0133059 A1* | 6/2011 | Kim | G01J 1/46 |
| | | | 250/214 R |
| 2011/0142232 A1* | 6/2011 | Jeong | H04L 9/0662 |
| | | | 380/42 |
| 2011/0161052 A1* | 6/2011 | Boufounos | H03M 7/30 |
| | | | 702/189 |
| 2011/0231464 A1* | 9/2011 | Rivoir | G06F 7/584 |
| | | | 708/232 |
| 2012/0030450 A1* | 2/2012 | Yu | G06F 9/30007 |
| | | | 712/220 |

\* cited by examiner

LINK AGGREGATOR WITH UNIVERSAL PACKET SCRAMBLER APPARATUS AND METHOD

This application claims priority to and the benefit of U.S. Provisional Patent Application Ser. No. 61/833,285 that was filed on Jun. 10, 2013, entitled METHOD AND SYSTEMS FOR UNIVERSAL PACKET SCRAMBLER ARCHITECTURE, the entirety of which is incorporated by reference herein.

FIELD OF THE INVENTION

The present disclosure relates to data scrambling or descrambling in data link aggregation, and more particularly to link aggregators and additive scramblers or descramblers therefor with programmable scrambling or descrambling polynomials.

BACKGROUND

Link aggregators provide automatic digital multiplexing and de-multiplexing for aggregating both transmit and receive data transfer for a number of low-speed channel sources using a single or a small number of high-speed channels. Such data aggregators can be used to reduce the number of physical links required for a specified data throughput by multiplexing multiple low-speed serial links into higher-rate serial links, where certain link aggregators allow independent operation of low-speed channels or lanes at different data transfer rates or speeds. Transmit data paths and link aggregators can include encoding as well as scrambling circuitry, with the data scrambling typically following interleaving/multiplexing circuitry. Receive data paths may similarly include decoding as well as descrambling circuitry, commonly provided prior to de-multiplexing. A typical configuration includes a pair of link aggregators at opposite ends of a high-speed transmission medium, each having local connections to low-speed data sources/consumers, with the link aggregators and intervening high-speed communications channel(s) facilitating point-to-point bidirectional communications using fewer end-to-end physical links without sacrificing overall throughput.

Digital data scrambling and descrambling ideally provides a relatively high degree of randomness in the data flowing in the high-speed transmission medium, thereby mitigating or avoiding long sequences of bits of the same value, wherein scrambling can be viewed as a randomizing operation. Data scrambling provides significant advantages in certain applications, including improved clock recovery capabilities and reduced interference. For instance, improper scrambling (or no scrambling) may render the high-speed data transmitted between link aggregators highly input data dependent, with the possibility of including long sequences of identical bits. This condition makes it more difficult for clock recovery circuitry, automatic gain control (AGC) and other adaptive circuits of a receiver to function properly. Also, improper or insufficient scrambling (i.e., insufficient randomization) may result in highly data-dependent transmission power spectrum, thereby increasing the likelihood of exceeding maximum power spectral density requirements of a given transition medium, and increased likelihood of channel-channel interference.

Scrambling and descrambling ideally results in pseudo-random modification of the values of some bits in a data stream, where the type of scrambling and descrambling can be characterized in terms of a polynomial generating a specific pseudorandom bit sequence (PRBS). Different communications interface standards, however, utilize different polynomials. For example, fixed packet size scramblers using 8b/10b encoding for Synchronous Optical Networking (SONET) operate according to a scrambler polynomial $X^7+X+1$, whereas other communications standards employ different polynomials. Furthermore, encoding techniques employed in link aggregators may exacerbate the lack of randomness in transmitted data. For example, 8b/10b encoding may result in high dependency on input data characteristics, where constant 8-bit raw data translates to 10-bit constant data, thereby negatively impacting clock data recovery (CDR), interference, and other performance metrics in various applications such as Gigabit Ethernet, XAUI, CPPRI, PCI Express, USB3.0, IEEE1394, Serial ATA, Serial Attached SCSI (SAS), Fibre Channel, Serial Storage Architecture (SSA), InfiniBand, Serial RapidIO, DVB ASI, DisplayPort Main Link, DVE and HDMI, HyperTransporet, and CoaXPress. Consequently, improved link aggregators and scrambling/descrambling apparatus and techniques are desirable to facilitate highly random high-speed data transmission for use in association with a variety of different scrambler/descrambler polynomials.

SUMMARY

The present disclosure provides techniques and improved scrambling/descrambling apparatus for link aggregation and other applications in which a programmable register is provided for defining the scrambling or descrambling polynomial, and the configurable polynomial data is used to compute a polynomial matrix for operating an additive (or synchronous) scrambler or descrambler. A scrambler or descrambler pattern is computed in certain embodiments according to the polynomial matrix, and input data is bitwise exclusive-ORed with the computed scrambler or descrambler pattern to generate scrambled or descrambled output data. The scrambling or descrambling circuitry can be reconfigured for different polynomials by rewriting the programmable register, with the scrambler or descrambler automatically computing an updated polynomial matrix. Accordingly, the present disclosure provides universal coverage for a variety of different standards and corresponding scrambling polynomials, with adaptability for future standards and scalability for any length polynomial. Moreover, the concepts of the present disclosure facilitate provision of truly random data finding particular utility in high-speed transmission between link aggregators having universal, programmable packet scramblers and descramblers for use with any communications interface. Moreover, the configurable scrambling/descrambling can be used in association with any packet length, thereby providing significant advantages in future developed, custom, and/or existing applications.

In accordance with one or more aspects of the present disclosure, a link aggregator apparatus is provided, which includes a programmable electronic register or memory storing binary data representing a scrambler or descrambler polynomial, along with a matrix generator that computes a polynomial matrix at least partially according to the binary data in the electronic register. The link aggregator apparatus further includes an additive scrambler or descrambler circuit configured to compute a next scrambler or descrambler pattern at least partially according to the polynomial matrix and a current scrambler or descrambler pattern, as well as to compute scrambled or descrambled current output data at least partially according to the next scrambler or descrambler pattern and the current input data. In certain embodiments, the scrambler or descrambler circuit computes the next pattern by multiplying the polynomial matrix by the current scrambler or descrambler pattern, and computes the output data as a bitwise exclusive-OR of the next pattern and the current input data to provide parallel additive scrambling or descrambling. In certain embodiments, the programmable electronic register or memory, the matrix generator, and the additive scrambler or descrambler circuit are provided in a single integrated circuit. In certain embodiments, the link aggregator apparatus includes a programmable second electronic register or memory storing binary data representing a scrambler or descrambler seed value, with the scrambler or descrambler circuit initializing the current scrambler or descrambler pattern with the data from the second electronic register, and then updating the current pattern with the computed next pattern in subsequent operation. The link aggregator apparatus in certain implementations includes transmit circuitry with a programmable scrambler polynomial register, a transmit matrix generator and an additive scrambler, along with receive circuitry including a programmable descrambler polynomial register, a receive matrix generator, and an additive descrambler circuit. The transmit circuitry and the receiver circuitry are provided in a single integrated circuit in certain embodiments.

Further aspects of the present disclosure provide an apparatus to scramble or descramble current input data, comprising a programmable polynomial register or electronic memory storing binary data representing a scrambler or descrambler polynomial, along with a matrix generator circuit operative to compute a polynomial matrix according to the binary data in the programmable polynomial register or memory. The apparatus further includes a multiplier circuit operative to multiply the polynomial matrix by a current scrambler or descrambler pattern to generate a next scrambler or descrambler pattern, as well as an exclusive-OR circuit operative to perform a bitwise exclusive-OR of the next scrambler or descrambler pattern and the current input data to generate the scrambled or descrambled current output data. The apparatus in certain embodiments includes a programmable seed register storing binary data representing a scrambler or descrambler seed value, with the current pattern being initialized with the binary data in the programmable seed register and thereafter being updated with the computed next pattern in subsequent operation. In certain embodiments, moreover, the matrix generator circuit includes an adjustment vector computation circuit that computes an adjustment vector using the binary data in the programmable polynomial register, along with a working matrix computation circuit that computes a plurality of working matrices using an identity matrix and the adjustment vector, and a polynomial matrix computation circuit that computes the polynomial matrix using the working matrices.

Data scrambling or descrambling methods are provided according to further aspects of the disclosure, including computing a polynomial matrix according to a scrambler or descrambler polynomial represented as binary data stored in an electronic memory or register, and computing scrambled or descrambled output data at least partially according to current input data and a next scrambler or descrambler pattern derived from the polynomial matrix. In certain embodiments the polynomial matrix computation includes computing an adjustment vector using the binary data in the electronic memory, computing a plurality of working matrices using an identity matrix and the adjustment vector, and computing the polynomial matrix using the working matrices. The method may further include automatically recomputing the adjustment vector, the working matrices, and the polynomial matrix in response to updating of the scrambler or descrambler polynomial represented as binary data stored in the electronic memory in certain embodiments. In various embodiments, moreover, the computation of the scrambled or descrambled output data comprises multiplying the polynomial matrix by a current scrambler or descrambler pattern to generate the next scrambler or descrambler pattern, and performing a bitwise exclusive-OR of the next scrambler or descrambler pattern and the current input data to generate the scrambled or descrambled current output data.

DESCRIPTION OF THE VIEWS OF THE DRAWINGS

The following description and drawings set forth certain illustrative implementations of the disclosure in detail, which are indicative of several exemplary ways in which the various principles of the disclosure may be carried out. The illustrated examples, however, are not exhaustive of the many possible embodiments of the disclosure. Other objects, advantages and novel features of the disclosure will be set forth in the following detailed description when considered in conjunction with the drawings, in which:

FIG. 8 illustrates an exemplary adjustment vector computed by the matrix generator of FIG. 7 according to the scrambler polynomial of FIG. 6;

FIG. 9 illustrates an exemplary 32-bit identity matrix used in computing working matrices in the matrix generator of FIG. 7;

Figure 10:
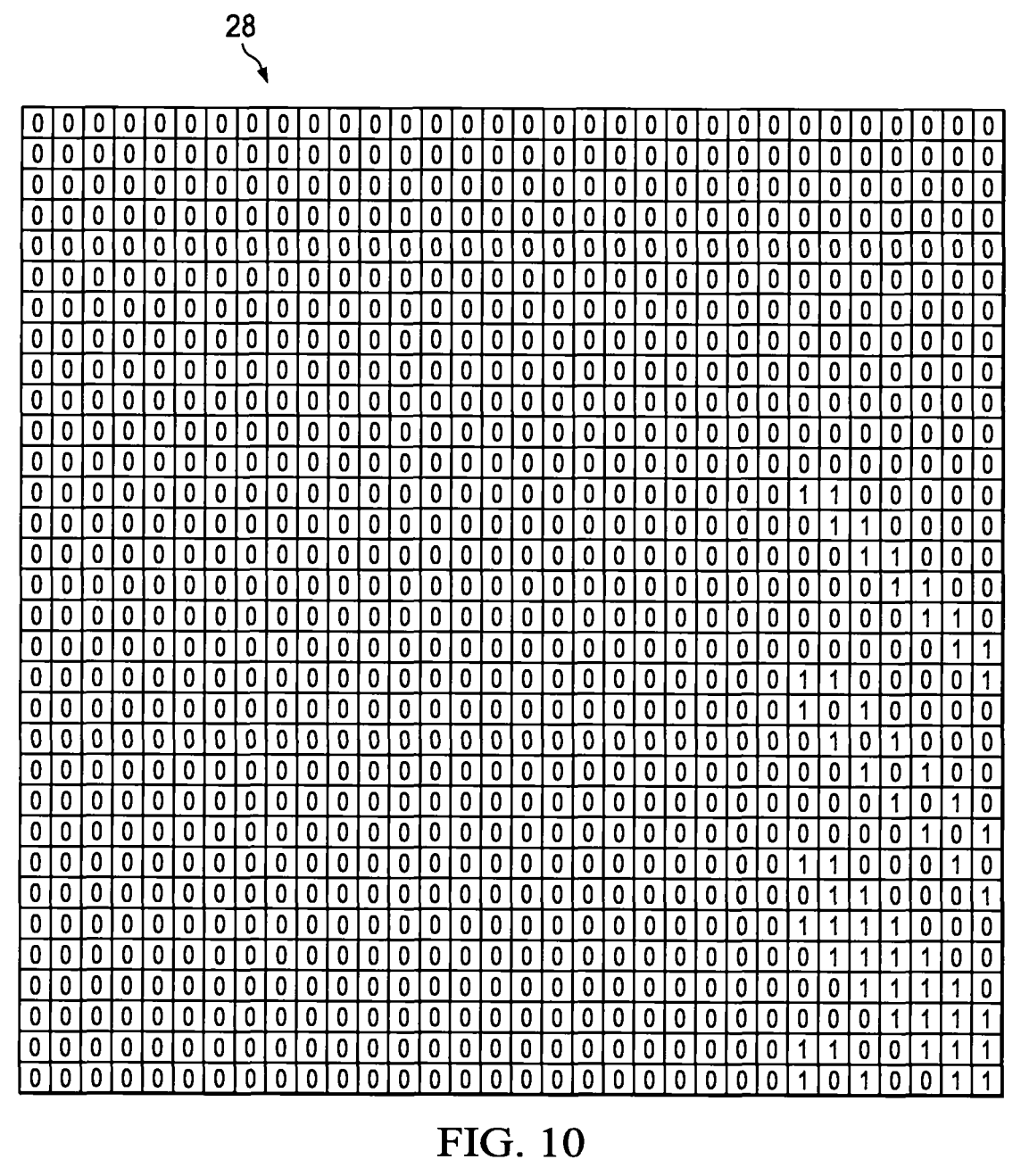

FIG. 10 illustrates an exemplary polynomial matrix provided by the matrix generator of FIG. 7 based on the scrambler polynomial register data of FIG. 6;

DETAILED DESCRIPTION

Figure 1:
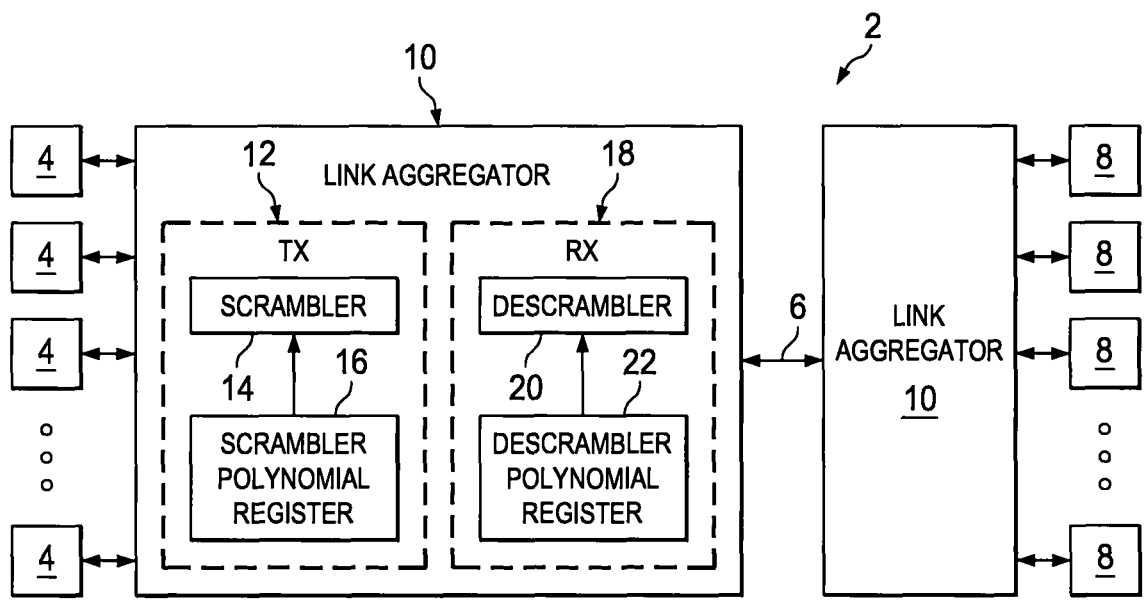
FIG. 1 is a simplified system diagram illustrating a pair of link aggregators connected to an intervening high-speed communications channel and having programmable additive parallel transmit data path scramblers and receive data path descramblers.

One or more embodiments or implementations are hereinafter described in conjunction with the drawings, wherein like reference numerals are used for reference to like elements throughout, and wherein the various features are not necessarily drawn to scale.

FIG. 1 illustrates an exemplary communications system 2 having low-speed data sources/consumers 4 and 8 located on opposite sides of a pair of link aggregators 10 joined by an intervening high-speed data communications medium 6. In this example, an integer number of low-speed sources/consumers 4 (left side of the figure) are connected to bidirectional ports of a first link aggregator 10, with the remaining illustrated sources/consumers 8 connected to bidirectional ports of the other link aggregator 10 (e.g., right side of the figure). The link aggregators 10 each provide for multiplexing/demultiplexing of transmit and receive signal paths 12, 18, respectively, where the transmit (TX) signal paths 12 include a scrambler circuit 14 and an associated scrambler polynomial register 16, and the receive (RX) data paths 18 include a descrambler circuit 20 and a corresponding descrambler polynomial register 22. In operation, both link aggregators 10 in a typical configuration are programmed with corresponding polynomial register data for scrambling and descrambling such that data transmitted by one link aggregator 10 through the high-speed communications link 6 to the other link aggregator 10 can be scrambled on the transmit side and descrambled on the receive side. In the illustrated embodiments, the configurable scrambler 14 and descrambler 20 and the programmable register 16 and 22 are provided on a single integrated circuit product together with other functional circuits to form a link aggregator IC 10.

Figure 2:
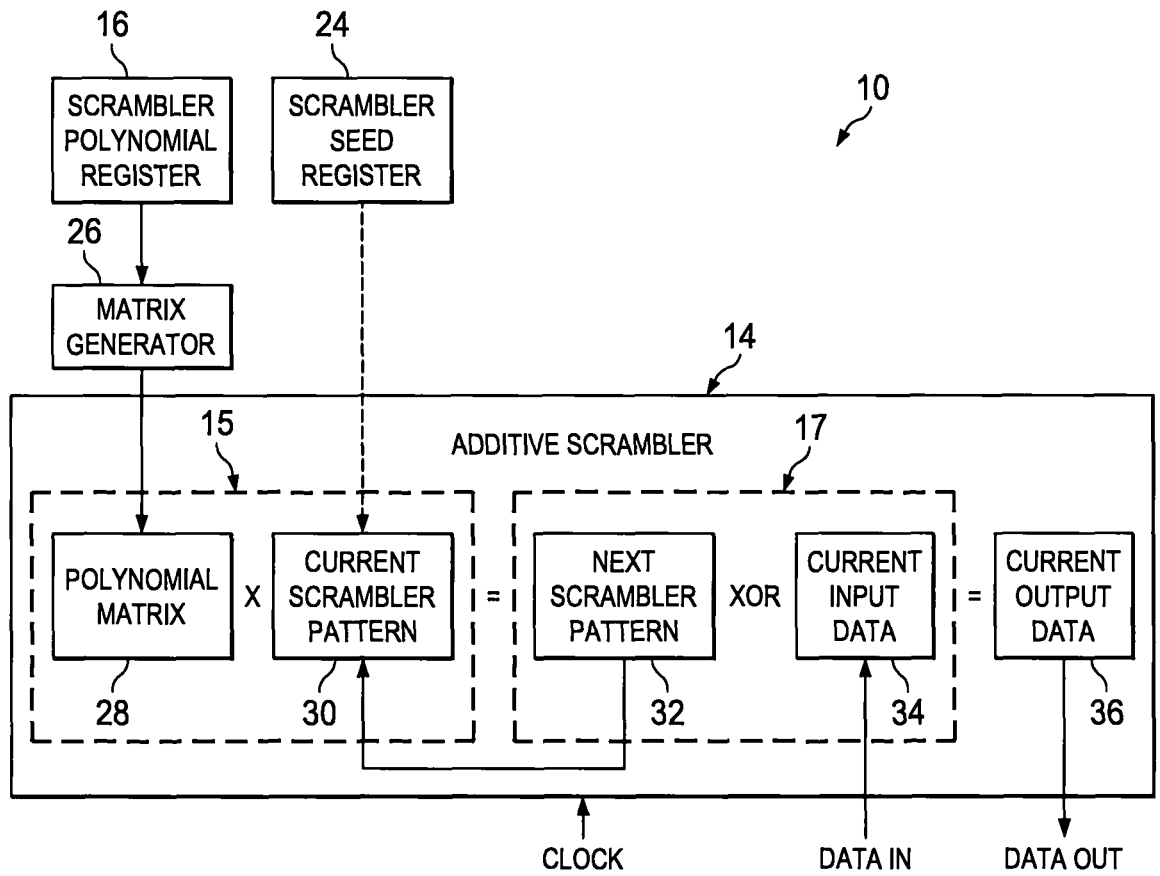
FIG. 2 is a schematic diagram illustrating an exemplary additive scrambler and associated programmable scrambler polynomial register in the link aggregator of FIG. 1.

FIG. 2 illustrates further details of an exemplary additive (synchronous) scrambler circuit 14 in the transmit signal path 12 of the link aggregator 10 in FIG. 1. A matrix generator 26 computes a polynomial matrix 28 according to the polynomial represented by the data in the scrambler polynomial register 16, and provides this to the scrambler 14. In addition, the additive scrambler 14 receives binary data from a scrambler seed register 24 as described further below. The scrambler 14 in this example includes a multiplier circuit 15 that multiplies the polynomial matrix 28 by a current scrambler pattern 30 to generate a next scrambler pattern 32. In addition, an exclusive-OR (XOR) circuit 17 performs a bitwise (e.g., packet-based parallel) exclusive-OR (e.g., modulo 2 addition) of the computed next scrambler pattern 32 with received current input data 34 to generate scrambled current output data 36. The polynomial matrix 28, the scrambler patterns 30, 32 and the input and output data 34, 36 can be of any suitable size in terms of length. In one non-limiting example, the polynomial matrix 28 is a 32×32 bit square matrix, and the scrambler patterns 30, 32 and input and output data 34, 36 are of 32-bit length. In this example, moreover, a corresponding scrambler polynomial register 16 includes 32 data bits representing a scrambler polynomial. A matrix generator circuit 26 is provided in the link aggregator IC apparatus 10 to generate the polynomial matrix 28 at least partially according to the scrambler polynomial register 16 as detailed further below in connection with FIG. 7.

Any suitable multiplier circuitry 15 can be used to multiply the binary data of the polynomial matrix 28 by the current scrambler pattern vector 30 using known matrix multiplication techniques in order to generate a resulting 32-bit next scrambler pattern 32. Similarly, any suitable circuitry can be used to implement the exclusive-OR circuit 17 by which a modulo 2 addition is implemented on a bitwise basis, thereby providing a given bit of the current output data register 36 as the modulo 2 addition (without carry) of the corresponding bits of the next scrambler pattern 32 and the current input data 34. Further, the matrix generator circuitry 26 in FIG. 2 may be any suitable programmable or preconfigured logic circuitry, and may be implemented in whole or in part using processing elements. In certain implementations, the multiplier circuitry 15, the exclusive-OR circuit 17, and/or the matrix generator circuit 26 may be implemented using a processor core, programmable logic and/or preconfigured logic circuitry or combinations thereof. Moreover, the circuitry 15, 17, 26 may include various electronic memory elements, including without limitation memory cells, registers, shift registers, or the like. Similarly, the scrambler polynomial register 16 and the scrambler seed register 24 may be any suitable electronic memory.

The process of computing scrambled current output data 36 based on the received current input data 34 is performed in each cycle of a received clock (CLOCK), with the current scrambler pattern 30 being initialized with the contents of a scrambler seed register 24 (32 bits in this example). Thereafter, in subsequent operation, the current scrambler pattern 30 is updated with the computed next scrambler pattern 32, whereby the additive scrambler 14 computes a next scrambler pattern 32 and uses this to scramble the current input data 34 to generate the scrambled current output data 36 in each clock cycle, and then the next scrambler pattern 32 is again recomputed, this time using the previous scrambler pattern 30. For a given polynomial represented by the data of the scrambler polynomial register 16, moreover, the corresponding computed polynomial matrix 28 remains constant, with the operation of the additive scrambler 14 providing scrambled output data 36. In addition, if the scrambler polynomial register data 16 is updated, for example, by a user programming the link aggregator 10, the matrix generator 26 recomputes and provides an updated polynomial matrix 28 to the multiplier circuit 15 in the additive scrambler 14. In this manner, the scrambling functions of the transmit circuitry 12 can be easily and quickly adapted to different applications requiring different scrambler polynomial performance, thereby making the scrambler 14 universal.

Figure 3:
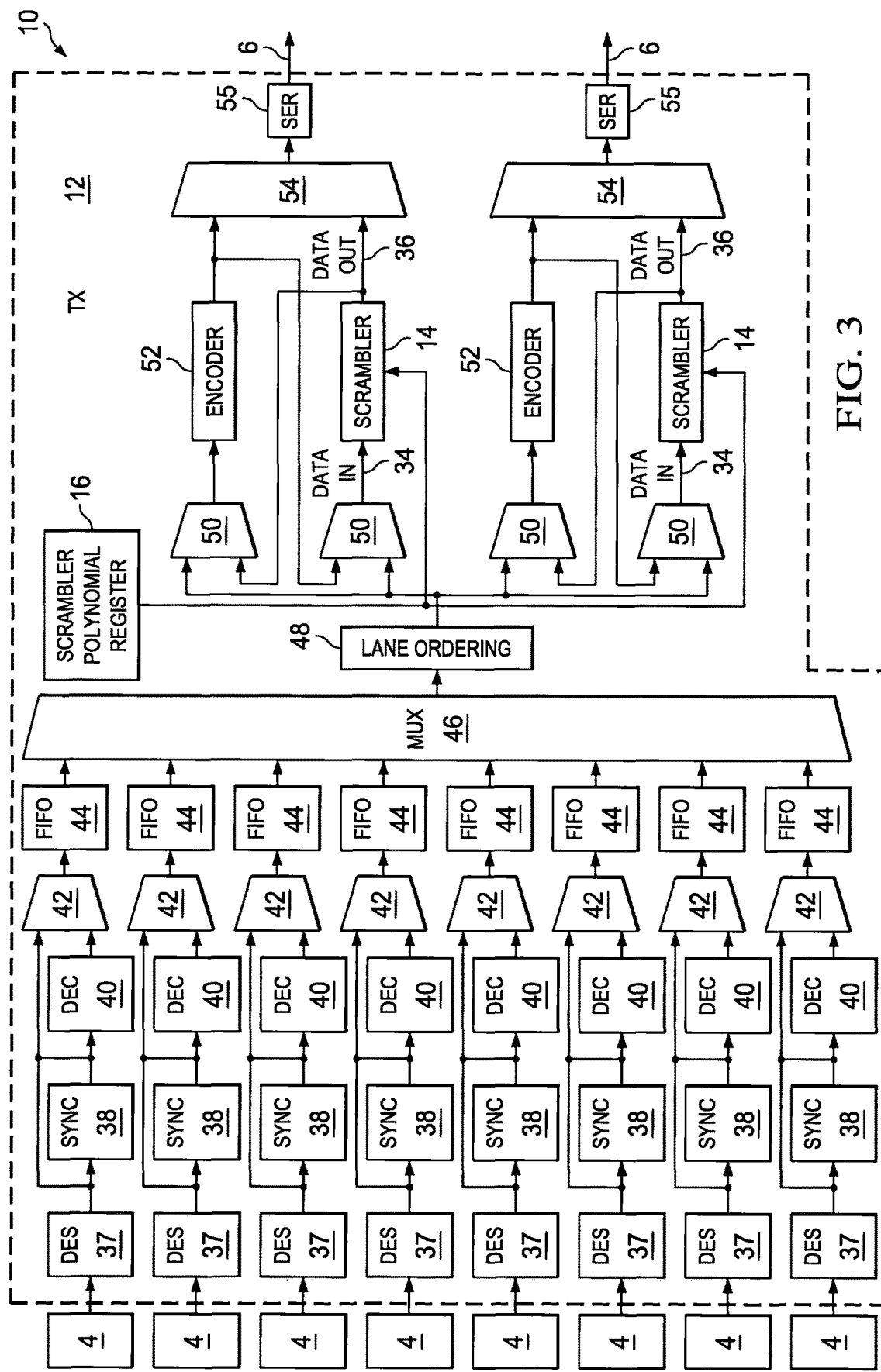
FIG. 3 is a schematic diagram illustrating an exemplary transmit data path in the link aggregator of FIG. 1.

FIG. 3 illustrates an 8-channel transmit circuit embodiment 12 for operative aggregating interconnection of up to eight low-speed data sources 4 with one or more high-speed transmit connections 6. The example of FIG. 3 provides two separate transmit paths to the high-speed communications medium 6, although other embodiments are possible providing only a single transmit interface to the high-speed medium 6, or more than two separate transmit paths may be provided in other embodiments. As seen in FIG. 3, each low-speed channel provides an initial deserializer (DES) circuit 37 providing deserialized (e.g. parallel) data which can be optionally aligned to word boundaries and decoded via optional synchronization (SYNC) and decoding (DEC) circuits 38 and 40, respectively (e.g., synchronized to 10-bit word boundaries based on a user-defined alignment character, and 8b/10b decoded in one example). A multiplexer 42 passes the deserialized transmit data either directly from the low-speed source 4, or from the synchronization circuit 38 and the decoder 40, wherein the multiplexer selection for each individual low-speed channel in certain embodiments may be individually configurable. The output of the multiplexer 42 is provided to a first-in-first-out (FIFO) buffer 44 to compensate for phase differences between the low speed serial links 4 and the high-speed side 6 of the aggregator 10, and the FIFO 44 may perform clock tolerance compensation in certain embodiments.

The FIFO output is provided to an aggregator or multiplexer circuit 46 and a lane ordering circuit 48. The data aggregation can be performed in a variety of different manners, for example, word interleaving or bit interleaving. The programmable lane ordering circuit 48 is configurable to perform a variety of data aggregating functions, and provides an output data stream as an input to a pair of multiplexed (e.g., configurable) encoder/scrambler circuits, each including programmable multiplexers 50, an encoder 52, and an additive scrambler 14 (e.g., as illustrated in FIG. 2), and an output multiplexer 54 providing data through a serializer 55 to the high-speed communications medium 6. The multiplexers 50, 54 in each of the multiplexed encoder/scrambler circuits allow configuration of the encoder 52 and the scrambler 14 to allow user configuration of the high-speed output data to be encoded without scrambling, scrambled without encoding, scrambled before encoding, or encoded before scrambling. Moreover, the scramblers 14 in the transmit circuitry 12 are configurable via a user programmable scrambler polynomial register 16 providing polynomial data to the scramblers 14.

Figure 4:
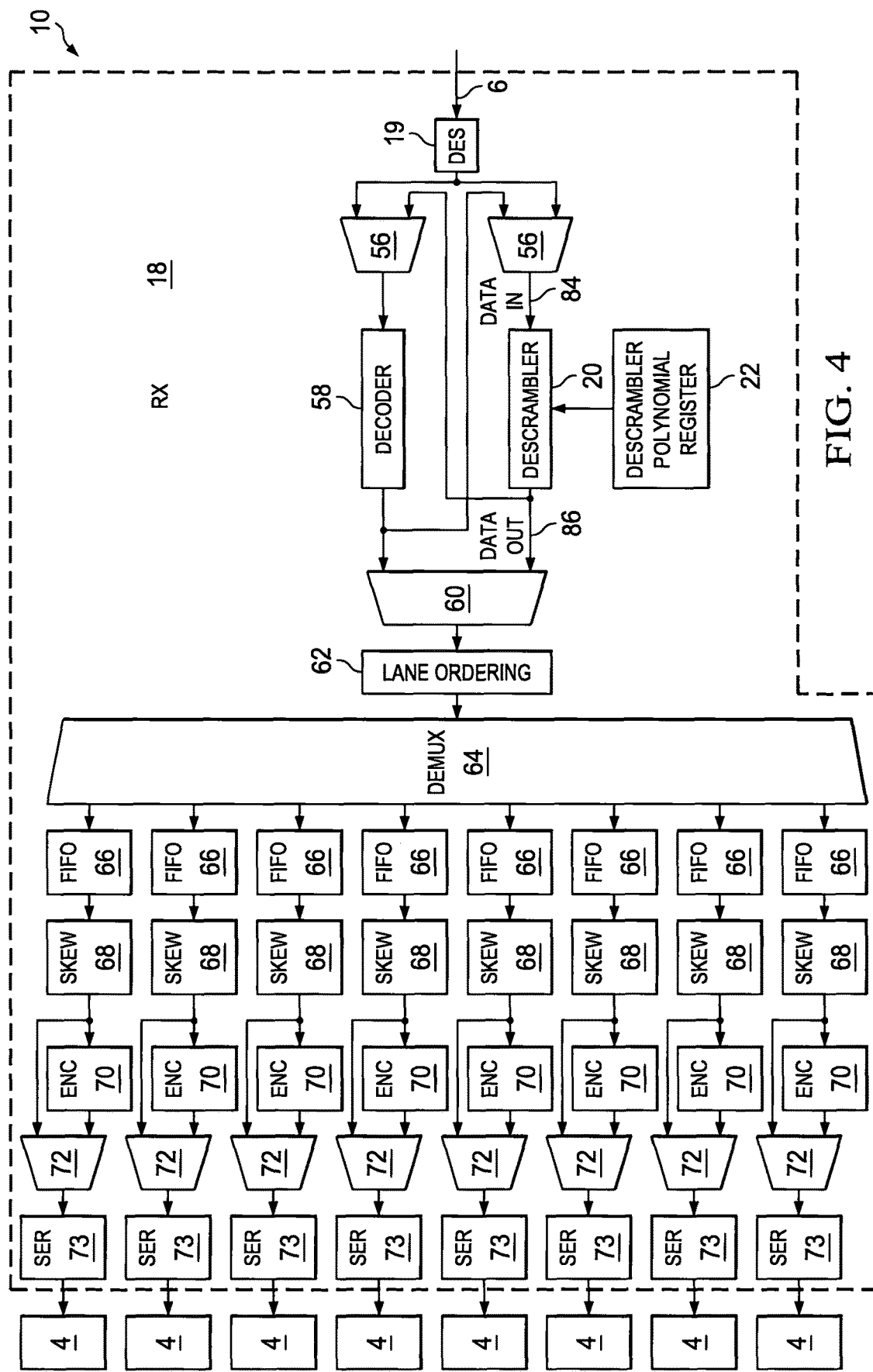
FIG. 4 is a schematic diagram illustrating an exemplary receive data path in the link aggregator of FIG. 1.
Figures 5, 6:
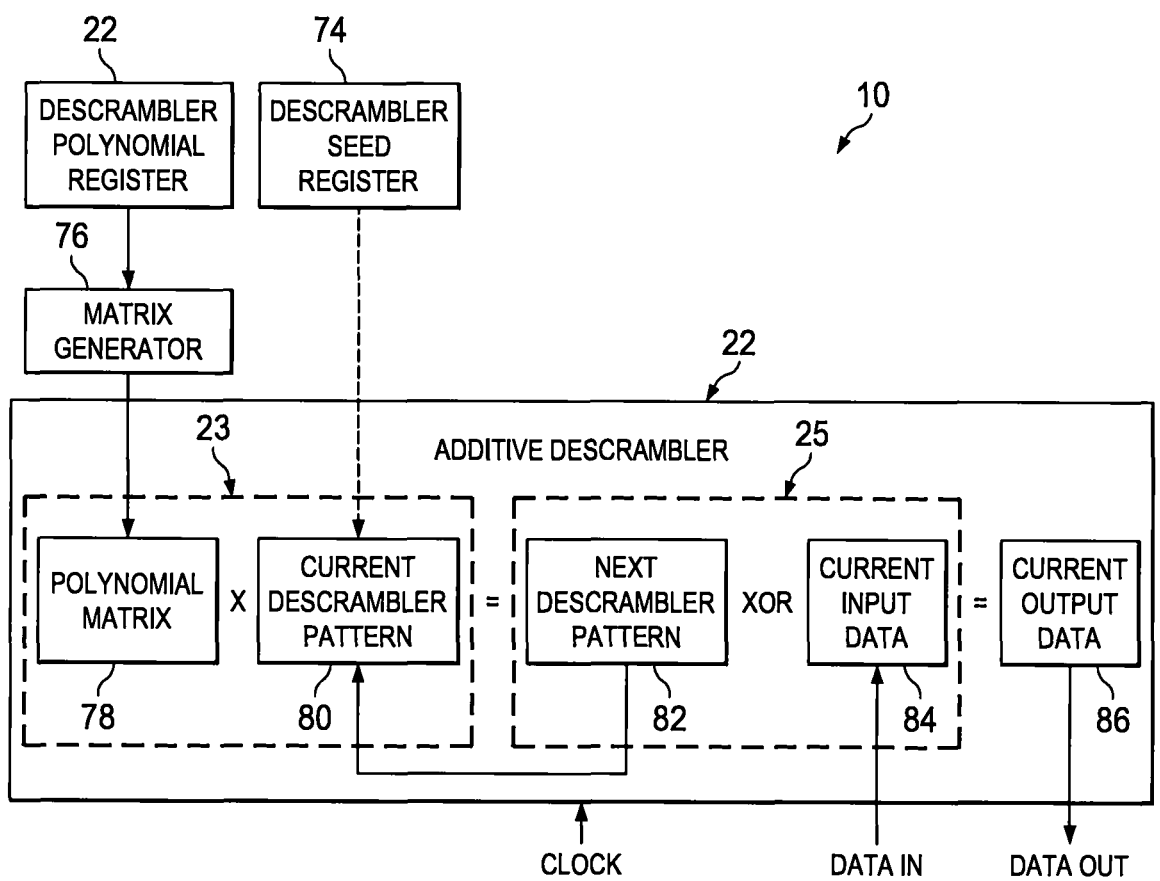
FIG. 5 is a schematic diagram illustrating an exemplary additive descrambler and associated programmable descrambler polynomial register in the link aggregator of FIG. 1.
FIG. 6 illustrates an exemplary scrambler polynomial register programmed or configured for a specific polynomial in the link aggregator of FIG. 1.

Referring also to FIGS. 4 and 5, configurable descrambling is also provided in the receive path circuitry 18 of the link aggregator 10. FIG. 4 illustrates an exemplary 8-channel receive circuit 18 for interfacing with the eight low-speed receive data consumers 4, along with a single receive interface to the high-speed communications medium 6. High-speed data is received from the communications medium 6 and deserialized via deserializer circuit 19 and may optionally be aligned (e.g., to 20-bit boundaries in one example) via channel synchronization logic (not shown). The deserialized data is then provided to a configurable encoder/descrambler stage having a first pair of multiplexers 56 providing respective outputs to a decoder 58 (e.g., 8b/10b in one example) and an additive descrambler 20, wherein further details of the exemplary descrambler 20 are illustrated in FIG. 5. As seen in FIG. 4, multiplexers 56 and 60 allow user configuration of the received data to be decoded via the decoder 58, or descrambled via the descrambler 20, encoded and then descrambled, or descrambled and then encoded, with the resulting data being provided from the output of the multiplexer 60 to a lane ordering circuit 62 which determines lane assignments. The output from the lane ordering circuit 62 is provided to a demultiplexer 64 for separation of the data into individual receive data streams provided through one of eight demultiplexed data received paths. Each of these individual receive paths includes a FIFO buffers 66 to absorb phase variations between the high-speed and low-speed clock domains and to compensate for clock rate differences, programmable skew buffer (SKEW) circuitry 68 (e.g., to add delays to certain lanes to meet system-level skew requirements), and encoder circuitry 70 (e.g., 8b/10b), with a multiplexer 72 operating to selectively provide receive data to a serializer (SER) circuit 73 for providing serial receive data to the corresponding data consumer 4 as either the output of the skew circuit 68 or the output from the encoder 70.

FIG. 5 illustrates further details of the exemplary additive descrambler 22 in the receive circuit 18 of FIG. 4, where a matrix generator circuit 76 (e.g., similar to the scrambler matrix generator circuit 26 described above in connection with FIG. 2) generates a descrambler polynomial matrix 78 at least partially according to polynomial data stored in the descrambler polynomial register 22, and the resulting polynomial matrix 78 is provided to the additive scrambler 22. In addition, a descrambler seed register 74 is provided in the link aggregator 10, which is user programmable to provide a seed value for the descrambling operation. As with the additive scrambler 14 of FIG. 2, the descrambler 22 in FIG. 5 operates according to a clock input CLOCK and includes a multiplier circuit 23 and an exclusive-OR circuit 25. The multiplier circuit 23 operates to multiply the polynomial matrix 78 by the current descrambler pattern stored in a register 80 to generate a next descrambler pattern 82. The exclusive-OR circuit 25 performs a bitwise exclusive-OR operation on the next descrambler pattern 82 and the current input data 84 (DATA IN) to generate the current output data 86 (DATA OUT).

Figure 7:
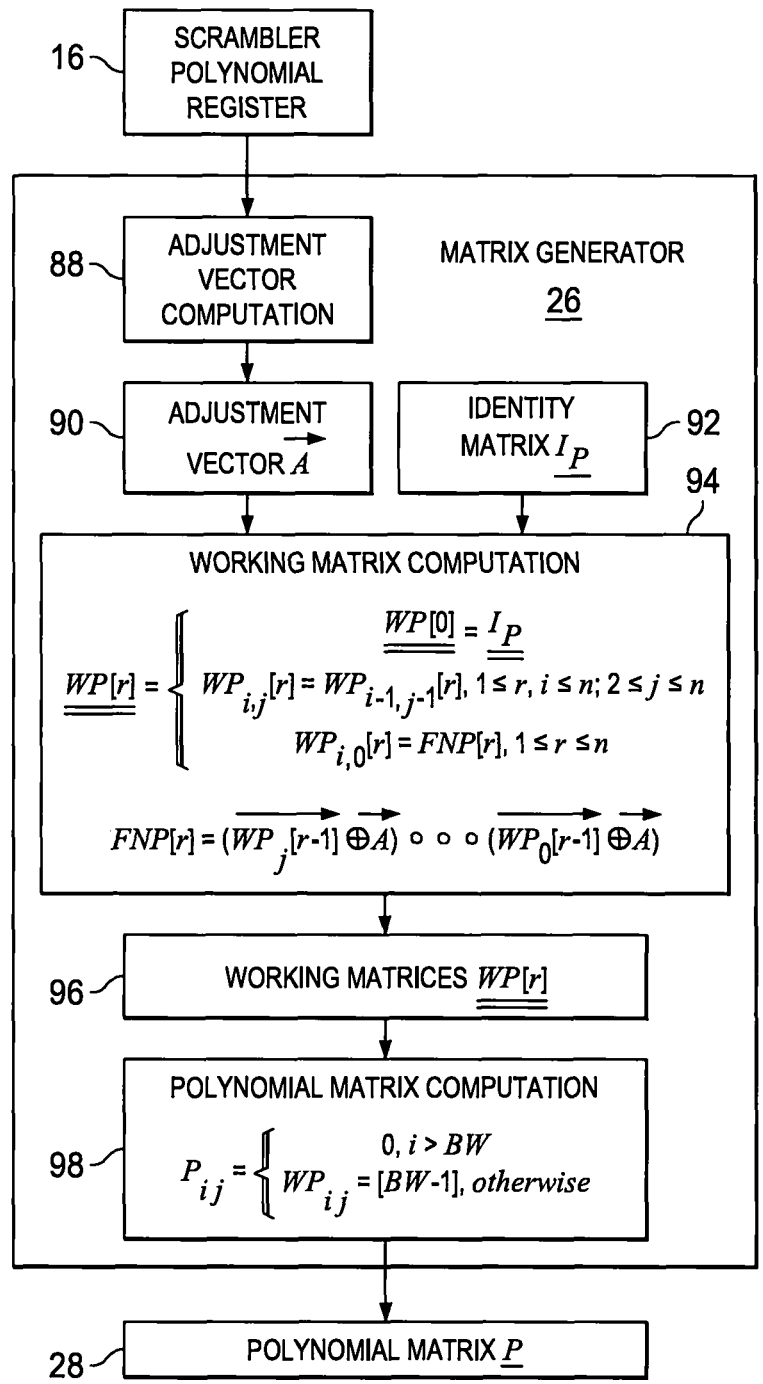
FIG. 7 is a schematic diagram illustrating an exemplary matrix generator circuit in the link aggregator of FIGS. 1 and 2.

Referring now to FIGS. 6-10, FIG. 7 illustrates further details of an exemplary matrix generator 26 in the scrambler circuitry of FIG. 2, and an exemplary descrambler matrix generator 76 (e.g., FIG. 5 above) can be constructed as shown in FIG. 7 for descrambling receiver data as well. FIG. 6 illustrates exemplary polynomial data in the scrambler polynomial register 16, in this case including individual bit positions associated with integer powers of a variable of the polynomial. As shown in FIG. 6, for instance, the rightmost bit (e.g., a "1" in this example) represents the power of "0" ($X^0=1$), the second bit from the right represents the power of "1" ($X^1=X$), etc., with the leftmost bit in this case indicating the power of "31" ($X^{31}$). The data in the scrambler polynomial register 16 of FIG. 6 thus represents a polynomial (PRBS-7) of the form $1+X^6+X^7$. As previously mentioned, the link aggregator 10 allows programming of the contents of the scrambler polynomial register 16, whereby any desired polynomial up to order 32 can be programmed by a user. Moreover, while the illustrated embodiment is described in terms of a 32-bit width using a 32-bit polynomial for the scrambler 14 (e.g., and for the descrambler 20), the concepts of the present disclosure are scalable to any integer number, which may be greater than 32.

Figures 8, 9:
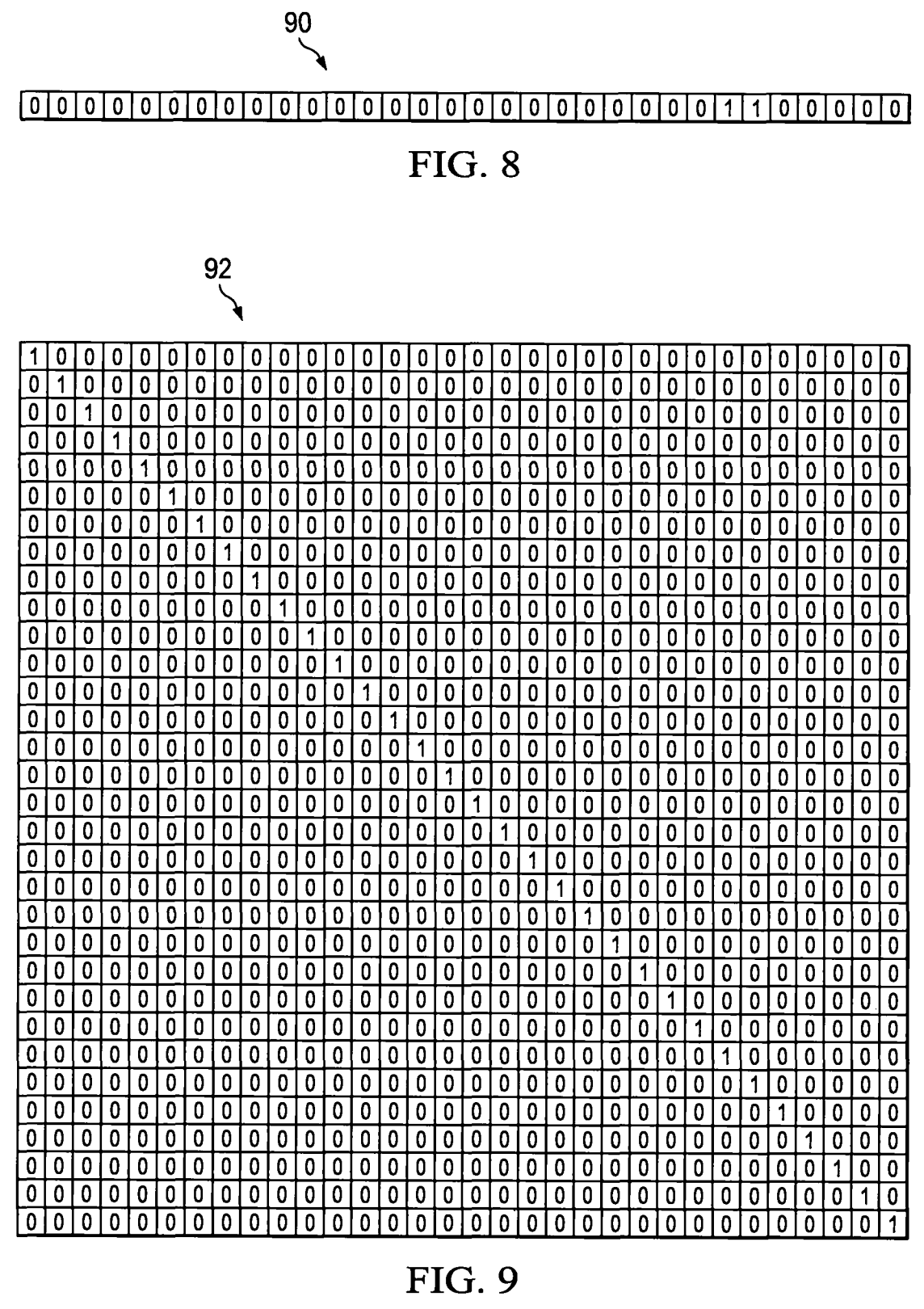

Returning to FIG. 7, the data from the scrambler polynomial register 16 is provided to the matrix generator circuit 26 for computing the polynomial matrix 90 ($\underline{P}$). An adjustment vector computation circuit 88 is provided in the matrix generator 26, which computes an adjustment vector 90 as seen in FIG. 8, also a 32-bit vector in this example. In operation, the computation circuit 88 truncates the lowest bit of the polynomial data from the register 16 (e.g., right shifts the data one bit position and sets the least significant bit (LSB at the right end of the data in FIG. 8) to "0" to form the adjustment vector $\vec{A}$ 90. Other embodiments are possible, in which an adjustment vector is computed via the circuit 88 using the binary data in the programmable polynomial register (16). The adjustment vector 90 and a 32×32 identity matrix 92 ($\underline{I_P}$, FIG. 9) are provided to a working matrix computation component 94, which computes 32 working matrices 96, each having 32 rows and 32 columns. The scrambler polynomial matrix 28 is then derived on a row-by-row basis in a computation circuit 98 according to the working matrices 96 $\underline{WP[r]}$, where r denotes the row of the polynomial matrix 28. The exemplary working matrices 96 are computed using the following formula at least partially according to the identity matrix 92 according to the following equations (1) and (2):

$$\underline{WP[r]} = \begin{cases} WP[0] = \underline{I_P} \\ WP_{i,j}[r] = WP_{i-1,j-1}[r], 1 \le r, i \le n; 2 \le j \le n, \\ WP_{i,0}[r] = FNP[r], 1 \le r \le n \end{cases} \quad (1)$$

where "i" and "j" are the row and column indices, respectively, and "n"=32, and:

$$FNP[r] = (\overrightarrow{WP_j[r-1]} \oplus \overrightarrow{A}) \bullet \ldots \bullet (\overrightarrow{WP_0[r-1]} \oplus \overrightarrow{A}) \quad (2)$$

With the set of 32 working matrices 96 computed, the computation circuit 98 computes the polynomial matrix 28 using the working matrices 96 according to the following equation (3):

$$P_{i,j} = \begin{cases} 0, & i > BW \\ WP_{i,j}[BW-1], & \text{otherwise} \end{cases} \quad (3)$$

where BW is the bus width 32 in this example (32 bit-wide input and output data 34 and 36, respectively). In the PRBS-7 polynomial example, for instance, the above matrix computation process yields the 32×32 scrambler polynomial matrix 28 as shown in FIG. 10.

Figure 11:
FIG. 11 illustrates a table showing various exemplary scrambler or descrambler polynomials which may be implemented using the link aggregator.

Referring also to FIG. 11, the link aggregator apparatus 10 and universal scrambler and descrambler apparatus 14, 20 may be configured to implement a variety of different scrambling and/or descrambling polynomials by programming the corresponding polynomial registers 16 and/or 22. FIG. 11 illustrates a table 99 showing various non-limiting examples of scrambling or descrambling polynomials 16, 22 which may be implemented using the illustrated 32-bit link aggregator embodiments 10. Other embodiments are possible, in which the programmable universal scrambling and/or descrambling concepts of the present disclosure may be extended beyond 32-bit implementations.

Figure 12:
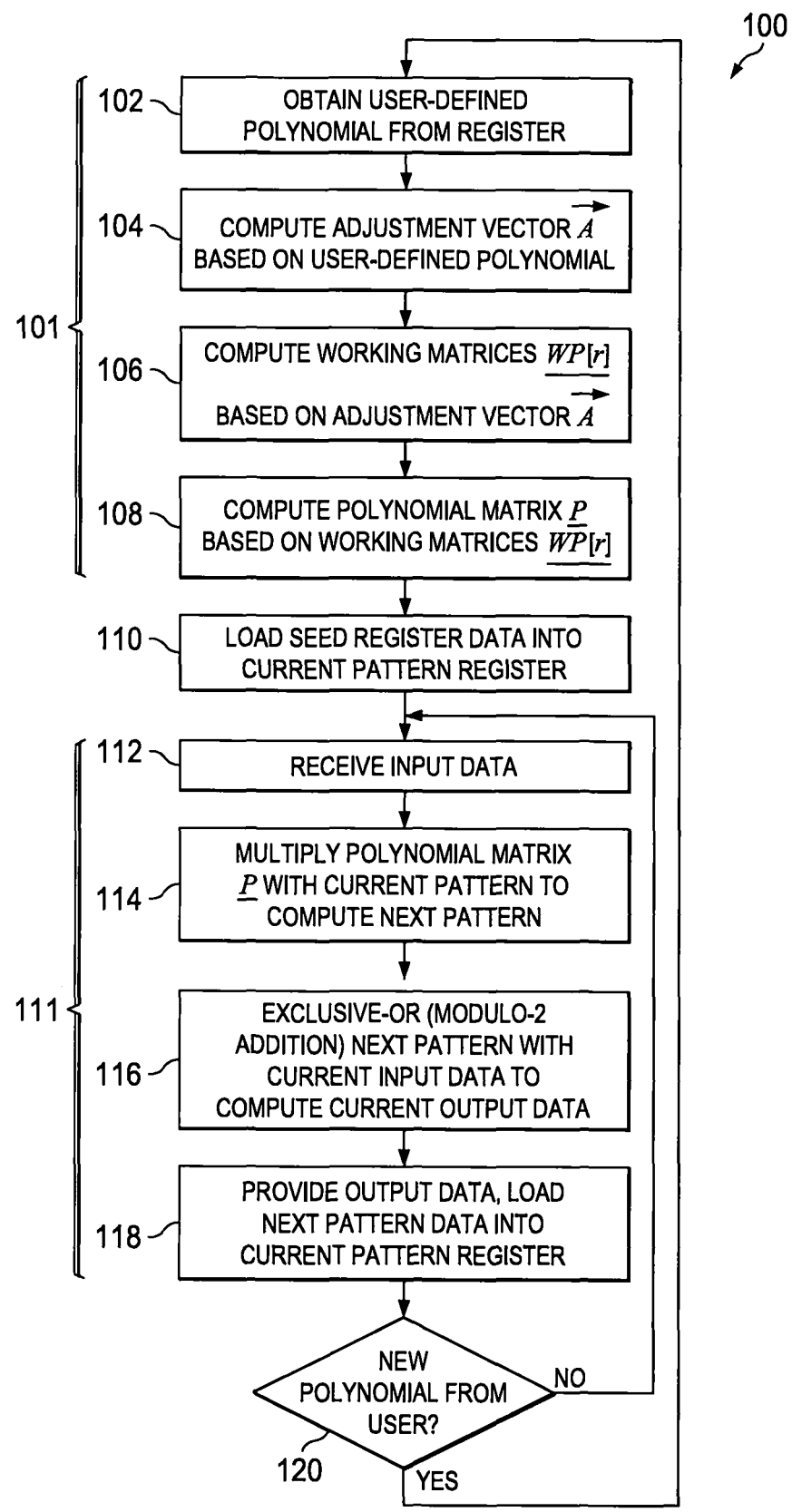
FIG. 12 is a flow diagram illustrating an exemplary method for operation of the scrambler or descrambler in the link aggregator of FIG. 1.

Referring also to FIG. 12, an exemplary process or method 100 is illustrated for data scrambling and/or descrambling according to various aspects of the present disclosure. Although the method 100 is illustrated and described below in the form of a series of acts or events, it will be appreciated that the various methods of the disclosure are not limited by the illustrated ordering of such acts or events. In this regard, except as specifically provided hereinafter, some acts or events may occur in different order and/or concurrently with other acts or events apart from those illustrated and described herein in accordance with the disclosure. It is further noted that not all illustrated steps may be required to implement a process or method in accordance with the present disclosure, and one or more such acts may be combined. The illustrated method 100 may be implemented in hardware, processor-executed software, processor-executed firmware, logic circuitry or combinations thereof, such as in the exemplary link aggregator apparatus 10 described above, and may be embodied in the form of non-transitory computer executable instructions stored in a computer readable medium, such as in an electronic memory operatively associated with the link aggregator apparatus 10 in one example.

The process 100 includes computing a polynomial matrix at 101 (e.g., scrambling polynomial matrix 28 and/or descrambling polynomial matrix 78) at least partially according to a polynomial represented as binary data stored in an electronic memory, such as the scrambler polynomial register 16 and/or the descrambler polynomial register 22 above. In addition, the process 100 in FIG. 12 includes computing scrambled or descrambled current output data at 111 (e.g., scrambled output data 36, descrambled output data 86) at least partially according to the current input data (e.g., 34, 84) and a next scrambler or descrambler pattern (e.g., 32, 82) derived from the polynomial matrix (e.g., 28, 78). The polynomial matrix computation at 101 in certain embodiments can be implemented on system power up and/or upon updating of the corresponding user-defined polynomial represented in the data of one or both of the scrambler polynomial register 16 and/or the descrambler polynomial register 22. Using the computed polynomial matrix (e.g., 28, 78), additive scrambling or descrambling is implemented at 111 to provide the scrambled or descrambled output data (e.g., 36, 86).

In the illustrated process 100, the polynomial matrix computation 101 includes obtaining a user-defined polynomial from a register at 102. In the exemplary scrambling implementation of FIG. 2, for instance, the matrix generator circuit 26 obtains the polynomial data from the scrambler polynomial register 16 at 102 in FIG. 12. At 104, an adjustment vector is computed based on the user-defined polynomial. In the non-limiting example of FIG. 7, the adjustment vector computation circuit 88 of the matrix generator 26 computes the adjustment vector 90 based on the contents of the scrambler polynomial register 16 as previously described. At 106, two or more working matrices are computed using an identity matrix and the adjustment vector, where the exemplary working matrix computation circuit 94 in FIG. 7 illustrates one possible implementation of the working matrix computation at 106 in FIG. 12 using the computed adjustment vector 90 (e.g., FIG. 8) and the identity matrix 92 (e.g., FIG. 9). Thereafter at 108, the polynomial matrix (e.g., scrambler polynomial matrix 28 in FIG. 10 above) is computed at 108 in FIG. 12 using the computed working matrices 96. As further shown in FIG. 12, seed register data is loaded at 110 into the current pattern register, for example, the contents of the scrambler seed register 24 in FIG. 2 is loaded into the current scrambler pattern register 30 at 110 in FIG. 12.

At 112 in FIG. 12, current input data is received, where the input data (DATA IN) 32 is loaded into the current input data register 34 in the scrambler example of FIG. 2. At 114 in FIG. 12, the polynomial matrix is multiplied with the current pattern to compute the next pattern. Continuing to reference the example of FIG. 2, the multiplier circuit 15 multiplies the scrambler polynomial matrix 28 by the current scrambler pattern 30 to obtain the next scrambler pattern 32 at 114 in FIG. 12. A bitwise exclusive-OR (e.g., modulo-2 addition) operation is performed at 116 in FIG. 12 on the next scrambler pattern and the current input data in order to compute the current output data. The exclusive-OR circuit 17 in FIG. 2 shows one example in which the next scrambler pattern data of the register 32 is exclusive-ORed with the current input data in the register 34 to obtain the current output data which is stored in the register 36. At 118 in FIG. 12, the output data is provided to the scrambler or descrambler output (e.g., the output data 36 from the scrambler 14 in FIG. 3 is provided to the inputs of the multiplexers 50 and 54). A determination is made at 120 in FIG. 12 as to whether a new polynomial has been entered by a user. If not (NO at 120), the process returns to 112 for scrambling or descrambling the next set of input data using the existing polynomial matrix 28. Otherwise (YES at 120), the updated polynomial is obtained from the register 16 at 102 and the polynomial matrix (e.g., 28, 78) is recomputed at 101 as previously described for use in scrambling or descrambling at 111.

The disclosed universal scrambler/descrambler concepts thus provide flexible additive packet-based architectures to facilitate ease of reconfiguration by operation of the user-programmable polynomial registers 16, 22 and the on-board matrix generator circuitry 26, 76, and thus provide universal link aggregator apparatus 10 which can be employed in a variety of different applications, and which can be field upgraded to accommodate a variety of different scrambler/descrambler polynomials, including future developed polynomials. The present disclosure thus presents a significant advance over conventional link aggregator apparatus in which the scrambling and descrambling hardware was dedicated for a given polynomial equation. Moreover, while the universal scrambler/descrambler apparatus has been illustrated and described in connection with link aggregator applications, the universal scrambling/descrambling concepts of the present disclosure find utility in any form of discrete additive scrambling or descrambling implementations.

The above examples are merely illustrative of several possible embodiments of various aspects of the present disclosure, wherein equivalent alterations and/or modifications will occur to others skilled in the art upon reading and understanding this specification and the annexed drawings. In addition, although a particular feature of the disclosure may have been disclosed with respect to only one of multiple implementations, such feature may be combined with one or more other features of other embodiments as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising".

What is claimed is:

1. A link aggregator apparatus, comprising:
   a programmable first electronic register storing binary data representing a scrambler or descrambler polynomial;
   an adjustment matrix generator circuit coupled to the programmable first electronic register and configured to:
   compute an adjustment vector by truncating a scrambler or descrambler polynomial represented as binary data;
   compute a plurality of working matrices using an identity matrix and the adjustment vector;
   a matrix generator coupled to the programmable first electronic register and configured to compute a user-defined polynomial matrix at least partially according to the binary data in the first electronic register and the plurality of working matrices; and
   an additive scrambler or descrambler circuit coupled to the matrix generator and configured to:
   compute a next scrambler or descrambler pattern at least partially according to the user-defined polynomial matrix and a current scrambler or descrambler pattern, and
   compute scrambled or descrambled current output data at least partially according to the next scrambler or descrambler pattern and the current input data.

2. The link aggregator apparatus of claim 1, comprising:
   a programmable second electronic register storing binary data representing a scrambler or descrambler seed value;
   wherein the additive scrambler or descrambler circuit initializes the current scrambler or descrambler pattern with the binary data in the second electronic register and then updates the current scrambler or descrambler pattern with the computed next scrambler or descrambler pattern in subsequent operation.

3. The link aggregator apparatus of claim 2, wherein the additive scrambler or descrambler circuit computes the next scrambler or descrambler pattern by multiplying the user-defined polynomial matrix by the current scrambler or descrambler pattern.

4. The link aggregator apparatus of claim 2, wherein the additive scrambler or descrambler circuit computes the scrambled or descrambled current output data as a bitwise exclusive OR of the next scrambler or descrambler pattern and the current input data.

5. The link aggregator apparatus of claim 1, wherein the additive scrambler or descrambler circuit computes the next scrambler or descrambler pattern by multiplying the user-defined polynomial matrix by the current scrambler or descrambler pattern.

6. The link aggregator apparatus of claim 5, wherein the additive scrambler or descrambler circuit computes the scrambled or descrambled current output data as a bitwise exclusive OR of the next scrambler or descrambler pattern and the current input data.

7. The link aggregator apparatus of claim 1, wherein the additive scrambler or descrambler circuit computes the scrambled or descrambled current output data as a bitwise exclusive OR of the next scrambler or descrambler pattern and the current input data.

8. A method for scrambling or descrambling current input data, the method comprising:
   computing an adjustment vector by truncating a scrambler or descrambler polynomial represented as binary data;
   computing a plurality of working matrices using an identity matrix and the adjustment vector;
   computing, by a matrix generator in a link aggregator, a user-defined polynomial matrix using the working matrices;
   computing, by the additive scrambler or descrambler circuit in the link aggregator, a next scrambler or descrambler pattern at least partially according to the user-defined polynomial matrix and a current scrambler or descrambler pattern; and
   computing, by the additive scrambler or descrambler circuit in the link aggregator, scrambled or descrambled current output data at least partially according to the next scrambler or descrambler pattern and the current input data.

9. The method of claim 8, comprising automatically recomputing the adjustment vector, the plurality of working matrices, and the user-defined polynomial matrix in response to updating of the scrambler or descrambler polynomial represented as binary data stored in the electronic memory.

10. The method of claim 9, wherein computing the scrambled or descrambled current output data comprises:
    multiplying the user-defined polynomial matrix by a current scrambler or descrambler pattern to generate the next scrambler or descrambler pattern; and
    performing a bitwise exclusive-OR of the next scrambler or descrambler pattern and the current input data to generate the scrambled or descrambled current output data.

11. The method of claim 8, wherein computing the scrambled or descrambled current output data comprises:
    multiplying the user-defined polynomial matrix by a current scrambler or descrambler pattern to generate the next scrambler or descrambler pattern; and
    performing a bitwise exclusive-OR of the next scrambler or descrambler pattern and the current input data to generate the scrambled or descrambled current output data.

* * * * *